United States Patent [19]
Kikuchi

[11] Patent Number: 6,118,750
[45] Date of Patent: Sep. 12, 2000

[54] RECORDING MEDIUM LOADING DEVICE

[75] Inventor: Hideo Kikuchi, Miyagi-ken, Japan

[73] Assignee: Alps Electric Co., Ltd., Tokyo, Japan

[21] Appl. No.: 09/160,440

[22] Filed: Sep. 24, 1998

[30] Foreign Application Priority Data

Oct. 2, 1997 [JP] Japan .................................. 9-269771

[51] Int. Cl.$^7$ ................................................. G11B 17/04
[52] U.S. Cl. .......................................................... 369/178
[58] Field of Search ................................... 369/176, 177, 369/178, 191, 192, 194

[56] References Cited

U.S. PATENT DOCUMENTS

| | | | |
|---|---|---|---|
| 4,086,636 | 4/1978 | Cizmic et al. | 360/75 |
| 5,434,833 | 7/1995 | Lee | 369/36 |
| 5,574,705 | 11/1996 | Suzuki | 369/36 |
| 5,738,565 | 4/1998 | Shebanow | 451/28 |
| 5,805,561 | 9/1998 | Pollard | 369/178 |
| 5,966,366 | 10/1999 | Pollard | 369/178 |
| 5,982,734 | 11/1999 | Yamashita et al. | 369/178 |

FOREIGN PATENT DOCUMENTS

| | | | |
|---|---|---|---|
| 0 492 764 A1 | 7/1992 | European Pat. Off. | |
| 0 492 965 A2 | 7/1992 | European Pat. Off. | |
| 0 833 326 A1 | 4/1998 | European Pat. Off. | 369/178 |
| 1101789 | 3/1961 | Germany | 369/30 |

*Primary Examiner*—David L. Ometz
*Assistant Examiner*—Franklin D. Altman, III
*Attorney, Agent, or Firm*—Brinks Hofer Gilson & Lione

[57] ABSTRACT

In a recording medium loading device which permits a package containing a recording medium to be loaded removably into the body of the device, the package have a guide groove extending in a direction of insertion into the device body and a lock groove contiguous to the guide groove and formed in a concave shape in a direction intersecting the direction of insertion. In a package loading area of the device body are provided a lock projection adapted to engage the lock groove to lock the package at a loaded position, an urging member for urging the lock projection in a direction of engagement with the lock groove, a restriction member which, when the package is inserted into the device body, restricts the lock projection positioned in the guide groove so as not to undergo an urging force of the urging member, and a release member which moves in interlock with the insertion of the package. The restriction member is operated by the release member upon or just before complete loading of the package into the package loading area to release the restriction imposed on the lock projection by the restriction member, allowing the lock projection to become engageable in the lock groove with the urging force of the urging member.

8 Claims, 6 Drawing Sheets

RECORDING MEDIUM LOADING DEVICE

BACKGROUND OF THE INVENTION

1. Field of the Invention

The present invention relates to a recording medium loading device for loading into the body of the device a package which contains a single or plural disks such as CD, CD-ROM, DVD, and/or PD, or a package which contains recording means other than disks.

2. Description of the Prior Art

In the body of a loading device into which is loaded, for example, a disk package containing a plurality of disks, there are provided an eject member which urges in an ejecting direction the disk package after insertion and a lock mechanism which locks the package in the device body to prevent ejection of the package.

According to a conventional structure of the lock mechanism, the disk package is formed with a guide groove extending in the direction of insertion into the device body and is also formed with a lock groove contiguous to the guide groove.

Also, in a package loading area of the device body is provided a lock projection which is urged in a direction of engagement with the lock groove.

Therefore, when the disk package is inserted into the package loading area, the lock projection and side walls of the guide groove slide while the lock projection is kept in pressure contact elastically with the side walls of the guide groove, and when the disk package has been loaded up to the final position, the lock projection is fitted in the lock groove, whereby the disk package is locked in a loaded state in the package loading area.

It is necessary to provide a detection switch for electrically detecting that the disk package has been loaded completely. In this case, if the detection switch can be operated by a lock member having the aforesaid lock projection, then when the lock member has turned to the position where the lock projection can be engaged with the lock groove, the output of the detection switch is changed over by the lock member to detect that the loading of the disk package has been completed.

However, the conventional disk package loading device described above involves the following problems.

(1) When the disk package is inserted into the body of the device, the lock projection undergoes an urging force of an urging member and slides while being kept in pressure contact elastically with the side walls of the guide groove formed in the disk package, so that the insertion load of the disk package becomes large. Particularly, when the disk package is inserted into an insertion port of the device body, it is necessary that the lock projection which undergoes the urging force be inserted forcibly into the guide groove, thus resulting in that the resistance at the beginning of the insertion becomes large.

(2) When the lock projection lies in the lock groove of the disk package, the lock projection is in elastic pressure contact with wall portions of the guide groove and therefore it cannot be used as a guide member during insertion of the disk package. Consequently, there arises the necessity of providing a large number of guide projections other than the lock projection, thus leading to an increase in the number and density of components arranged in the package loading area.

(3) In the device of the type in which the detection switch is actuated by the lock member, the detection switch is changed over when the disk package is loaded into the package loading area and the lock projection comes into engagement with the lock groove, but also when the disk package is taken out, the lock member turns and the detection switch is changed over. That is, between the time when the disk package is loaded and the time when it is taken out there is no difference in the state of change-over of the detection switch. Therefore, just after turning ON of a power supply, it is impossible to distinguish whether the disk package is loaded or is taken out.

The above problems arise not only in package loading devices containing disk packages but also in package loading devices containing other recording mediums than disk packages.

SUMMARY OF THE INVENTION

The present invention solves the above problems of the prior art and it is an object of the invention to provide a recording medium loading device wherein a lock projection does not act as an insertion load during the insertion of a package and wherein the package can be inserted into the device at a low load and particularly the load at the beginning of package insertion can be diminished.

It is another object of the present invention to provide a recording medium loading device wherein a lock projection for locking a package is allowed to function as a guide member, thereby permitting the reduction in the number of guide lugs.

It is a further object of the present invention to provide a recording medium loading device wherein a detection switch is changed over only when a package has been loaded, thereby ensuring the detection of a loaded state of the package.

According to the present invention, there is provided a recording medium loading device which permits a package containing a recording medium to be loaded removably into the body of the device, the package having a guide groove extending in a direction of insertion into the device body and a lock groove contiguous to the guide groove and formed in a concave shape in a direction intersecting the direction of insertion, and wherein in a package loading area of the device body are provided a lock projection adapted to engage the lock groove to lock the package at a loaded position, an urging member for urging the lock projection in a direction of engagement with the lock groove, a restriction member which, when the package is inserted into the device body, restricts the lock projection positioned in the guide groove so as not to undergo an urging force of the urging member, and a release member which moves in interlock with the insertion of the package, the restriction member being operated by the release member upon and just before complete loading of the package into the package loading area to release the restriction imposed on the lock projection by the restriction member, allowing the lock projection to become engageable in the lock groove with the urging force of the urging member.

In the present invention, since the lock projection is restricted so as not to be urged in its locking direction when the package is loaded, the load in the package loading is diminished. Particularly, since it is not necessary to insert the lock projection forcibly into the lock groove at the beginning of insertion of the package, the resistance at the beginning of the insertion can be diminished. It is also possible to use the lock projection as a guide member.

Moreover, since only when the package has been loaded accurately, the lock projection undergoes the urging force and is fitted in the lock groove, the locking of the package is ensured.

The package employable in the present invention is not limited to a package containing a plurality of disks, but may be a package containing a single disk or a package containing such a recording medium as memory or IC.

Preferably, in the device body is provided a detection switch whose detection output, when the restriction member operates in a direction to release the restriction of the lock projection, is changed over in interlock with this operation of the restriction member, and only when the package has been loaded into the package loading area, the restriction member operates to release the restriction of the lock projection and change over the detection switch.

In this construction, the detection switch is changed over only when the package has been loaded into the package loading area, and therefore the state of the device can be surely detected upon turning ON of the power supply.

For example, the release member is preferably integral with an eject member which moves together with the package when the package is loaded and which imparts an ejecting force to the package.

However, the release member is not specially limited insofar as it is a member other than the eject member and operates in interlock with the loading of the package.

Preferably, the eject member is provided with a restrictive pressing portion for moving the restriction member forcibly in the direction to restrict the lock projection when the eject member moves in the package ejecting direction.

According to this construction, when the package is not loaded, the lock projection assumes a surely restricted state.

DETAILED DESCRIPTION OF A PREFERRED EMBODIMENT

Figure 1:
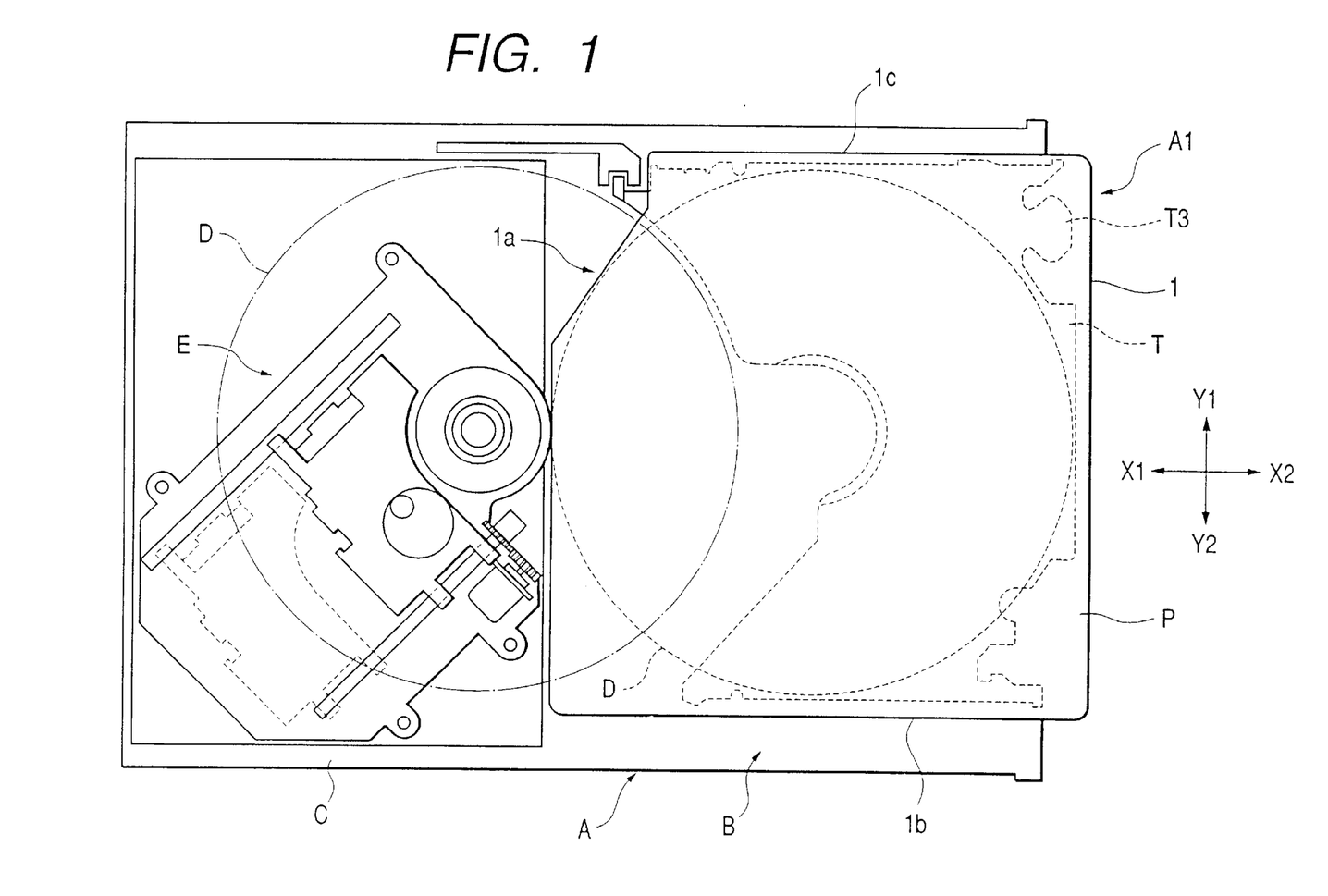
FIG. 1 is a sectional plan view of a disk unit embodying the present invention.
Figure 2:
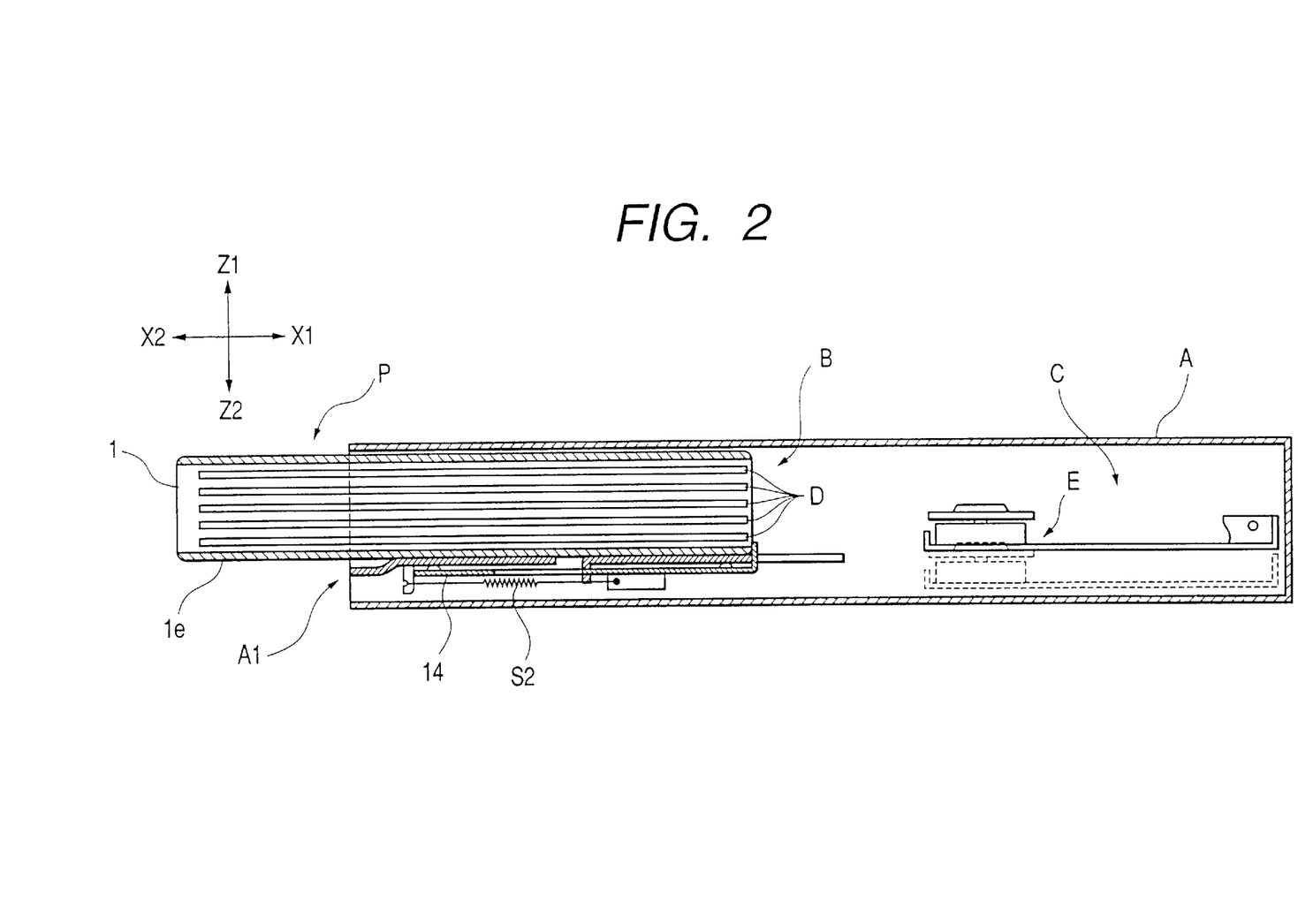
FIG. 2 is a longitudinal sectional view thereof.

FIG. 1 is a sectional plan view of a disk unit for loading therein of a disk package according to an embodiment of the present invention and FIG. 2 is a longitudinal sectional view thereof.

In the disk unit shown in FIGS. 1 and 2, a housing A is rectangular in plan and in the interior of the housing A are provided a package loading area B to which a disk package P is loaded and a disk driving area C. In the disk driving area C is disposed a disk drive means E for driving a disk D after drawn out from the disk package P.

The disk package P is inserted in X direction in FIGS. 1 and 2 into the housing A of the disk loading device through an insertion port A1 formed in a longitudinally front position of the rectangular shape of the housing and is loaded into the package loading area B.

Figure 3:
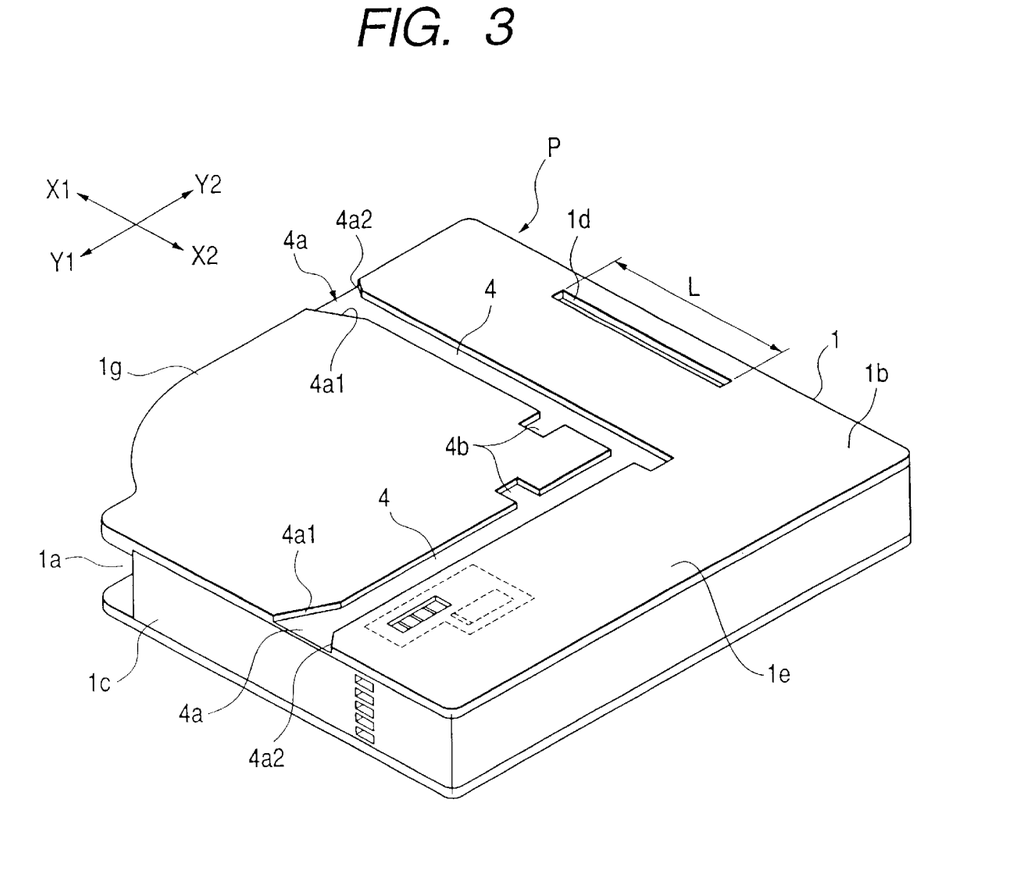
FIG. 3 is a perspective view with the bottom of a disk package facing upward.

FIG. 3 is a perspective view showing the appearance of the disk package, with the bottom of the package facing upward.

The disk package P is formed by a synthetic resin case 1, with an opening 1a being formed on X1 side in the figure. The opening 1a is for drawing out such tray T and disk D as indicated with dotted lines in FIG. 1. Through the opening 1a there are performed delivery and receipt of the disk D with respect to the disk drive means E.

A plurality of horizontal ribs (not shown) are projected on the inner surfaces of both left side plate 1b and right side plate 1c of the case 1 so that both right and left side edges of the tray T are slidable in X direction while being guided by adjacent such ribs. In the interior of the case 1 are formed plural stages of horizontal ribs and, for example, such five trays T as shown in FIG. 2 are accommodated within the case so that they can be drawn out.

Within the disk package P in this disk unit there can be received a disk having a diameter of 12 cm and a disk having a diameter of 8 cm. Also, both a ROM disk and a recordable RAM disk can be accommodated therein. Examples of ROM disks include CD and DVD-ROM, while examples of RAM disks include PD and DVD-RAM. Further, a single CD is an example of a disk having a diameter of 8 cm.

As shown in FIG. 3, two guide grooves 4, 4 are formed in X and Y directions in a bottom 1e of the disk package P. The guide grooves 4, 4 are formed linearly throughout the overall lengths in Y and Y directions. The guide groove 4 formed in X direction is used when the disk package P is inserted in X1 direction into the body of the device (the disk unit), as shown in FIG. 1, while the guide groove 4 formed in Y direction is for a disk unit of the type in which the disk package P is inserted in Y1 direction. At front ends (X1 and Y1 sides in the figure) of the guide grooves 4, 4 are respectively formed expanded portions 4a each defined by slant portions 4a1 and 4a2. Further, in the innermost portions on both X2 and Y2 sides are respectively formed lock grooves 4b which function as lock engaging portions for engagement therewith of a lock member 11 to be described later.

The disk package P containing various disks D is inserted and loaded into the package loading area B through the insertion port A1 of the housing A shown in FIGS. 1 and 2.

Figure 4:
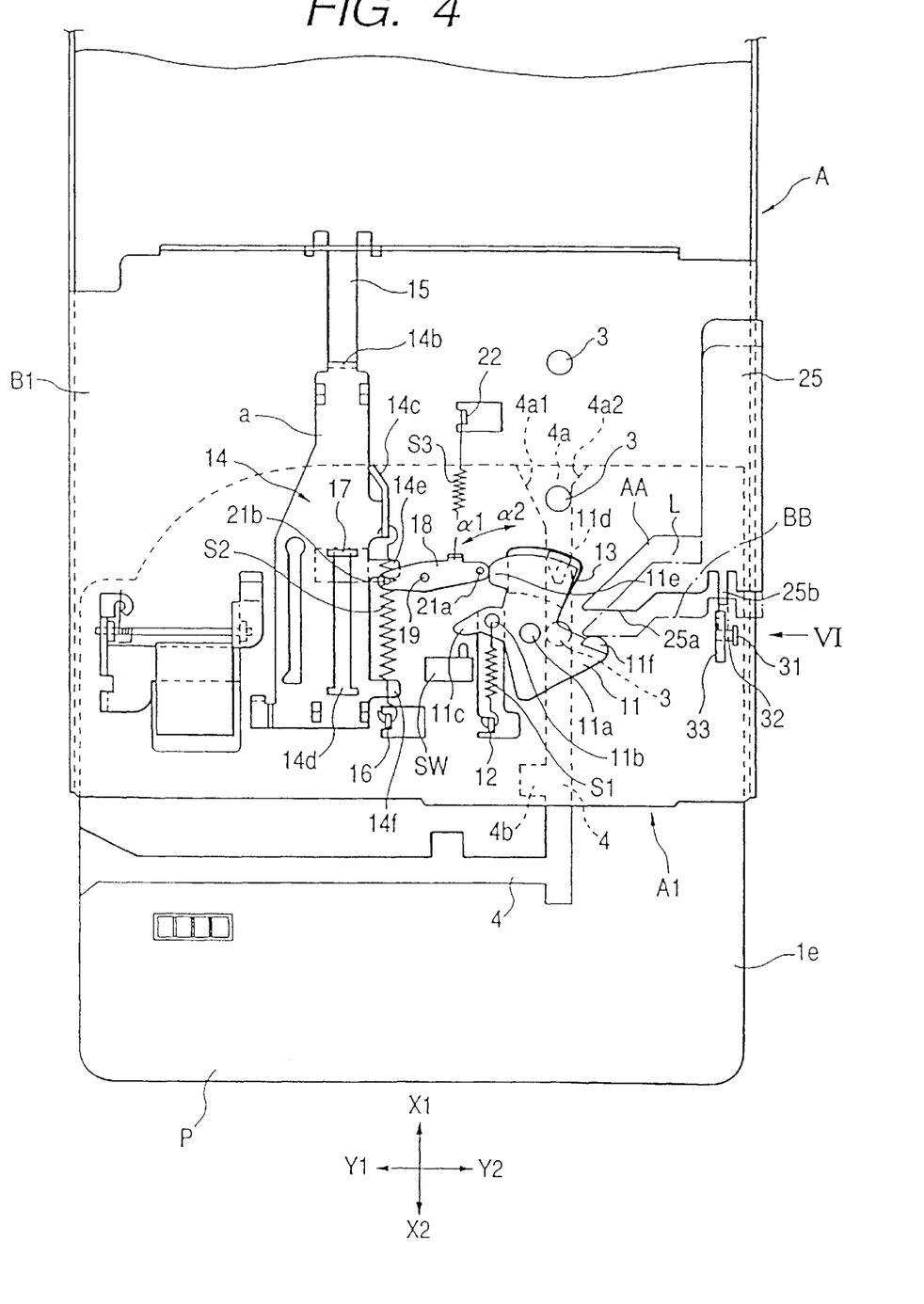
FIG. 4 is a bottom view showing a mechanical structure on the back side of a package loading area.
Figure 5:
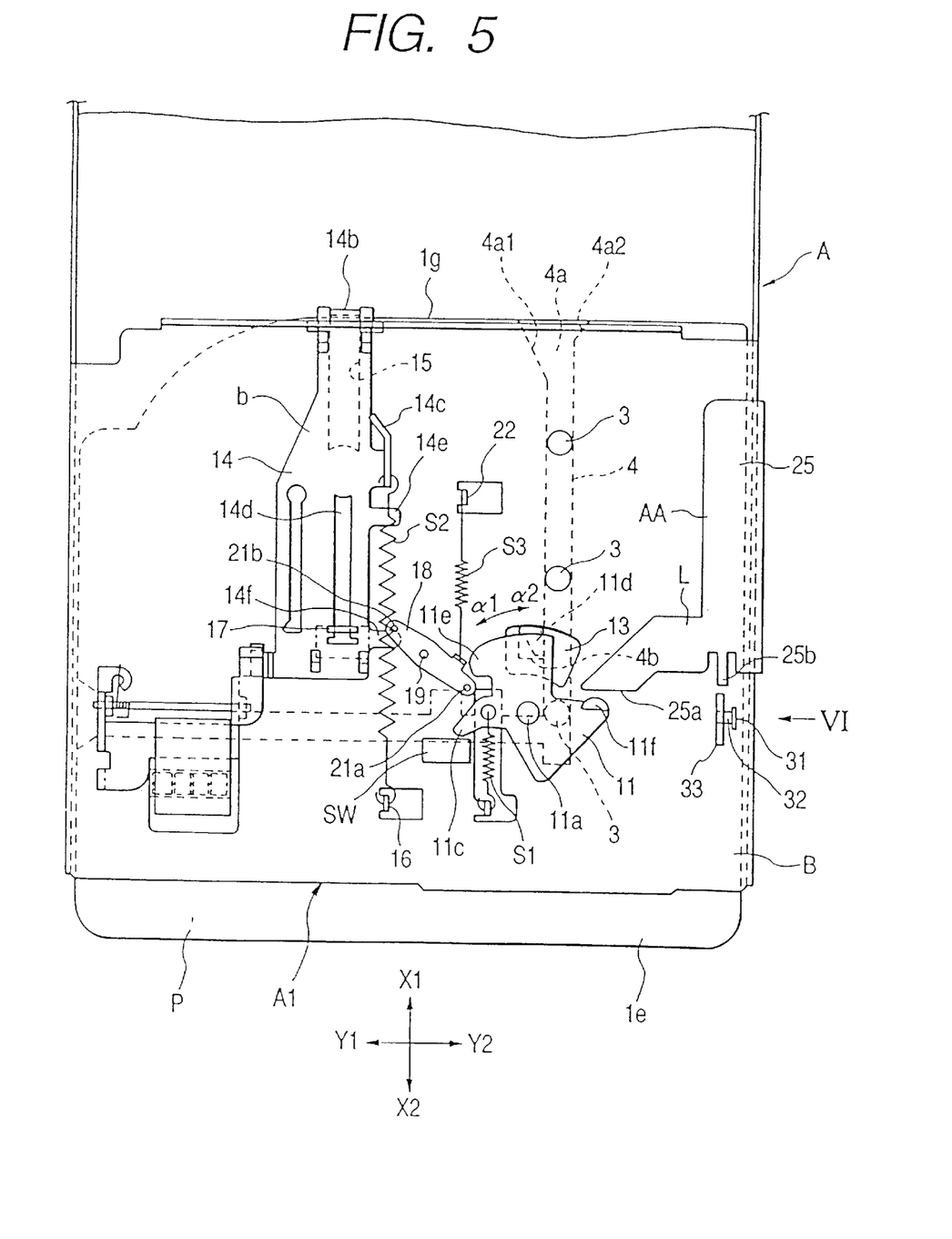
FIG. 5 is bottom view showing the mechanical structure on the back side of the package loading area, with the package loaded completely.

FIGS. 4 and 5 are bottom views showing a mechanical structure provided on the bottom of the package loading area of the housing, with the bottom side (back side) of the disk unit facing upward.

In the package loading area B, a plurality of guide lugs 3 are formed on a bottom plate B1 of the housing of the device body. The guide lugs 3 are each constituted by a pin or a screw having a low head and implanted in the bottom plate B1. As shown in FIGS. 4 and 5, the guide lugs 3 are arranged in a row in an X direction. Since each guide groove 4 is formed linearly, the guide groove slides on the plural guide lugs 3, whereby the disk package P is guided and inserted in X1 direction.

The numeral 11 denotes a lock member formed by injection molding of a synthetic resin for example. The lock member 11 is rotatable about a support shaft 11a as fulcrum. The support shaft is fixed to the bottom plate B1. An urging member S1 such as, for example, a coiled spring is stretched between a hole 11b formed in the lock member 11 and a retaining portion 12 formed by bending from the housing A. With the urging member S1, the lock member 11 is urged in the direction of α1 in the figure. A switch pushing portion 11c extends in Y1 direction from the portion where the hole 11b is formed. A detection switch SW is mounted on the bottom plate B1 in such a manner that the switch pushing portion 11c is opposed to the switch SW.

The X1-side front end portion of the lock member 11 is integrally formed with a lock projection 11d extending toward the package loading area B. The projection 11d gets in a sectorial hole 13 formed in the bottom plate B1 of the housing A and projects into the package loading area B. On the Y1 side of the lock member is formed an abutting portion 11e, while on the Y2 side is formed an unlocking projection 11f integrally.

On the bottom plate B1 in the package loading area B of the housing A is mounted an eject plate 14. At an end portion in the X1 direction of the eject plate 14 is formed a T-shaped receptacle portion 14b which is bent inward of the housing A. The receptacle portion 14b is inserted into a guide groove 15 formed in the bottom plate B1. In the eject plate 14 is formed a guide groove 14d, into which is inserted a T-shaped projection 17 formed by bending from the bottom plate B1. The eject plate 14 is adapted to move linearly in X direction along both guide grooves 15 and 14d.

Between a retaining portion 14c formed on the eject plate 14 and a retaining piece 16 formed by bending on the bottom plate B1 in the package loading area B is stretched an urging member (eject urging member) S2 such as, for example, a coiled spring. The eject plate 14 is kept urged in X2 direction with the urging force of the urging member S2. FIG. 4 shows a state (a) in which the eject plate 14 has moved the longest distance in X2 direction. In this state, the receptacle portion 14b of the eject plate 14 strikes against the X2-side end portion of the guide groove 15, or the X1-side end portion of the guide groove 14d strikes against the T-shaped projection 17, whereby a further movement of the eject plate 14 in X2 direction from the position (a) is prevented.

On the Y2-side edge portion of the eject plate 14 are integrally formed a pair of lugs in a spaced relation to each other, of which the lug positioned on the X1 side is a restrictive pressing portion 14e and the lug positioned on the X2 side is a releasing pressing portion 14f. The eject plate 14 and the releasing pressing portion 14f function as a release member for releasing a restricting motion of a restriction link 18 against the lock member 11.

Between the lock member 11 and the eject plate 14 is disposed a restriction link 18 as a restriction member. The restriction link 18 is supported rotatably by a shaft 19 fixed to the bottom plate B1. Between the restriction link 18 and a retaining piece 22 formed on the bottom plate B1 is stretched an urging member (restrictive urging means) S3 such as, for example, a coiled spring. With the urging member S3, the restriction link 18 is urged in the counterclockwise direction. Pins 21a and 21b are fixed respectively to both ends of the restriction link 18. One pin 21a is opposed to the abutting portion 11e of the lock member 11 so that it can come into abutment with the abutting portion, while the other pin 21b is opposed to the position where it is pressed by the restrictive pressing portion 14e and the releasing pressing portion 14f of the eject plate 14.

At the Y2-side edge portion of the bottom plate B1 is mounted a lever 25 so as to be movable in X1–X2 directions. With the power of a motor, the lever 25 is driven in X1–X2 directions, and with this moving force of the lever 25, the disk driving means shown in FIG. 2 is moved vertically in Z1–Z2 directions. By this vertical movement, a disk D present within the disk package P is selected. As the lever 25 moves in X2 direction, the disk driving means descends in Z2 direction, but when the lever 25 has reached the position indicated by AA in FIGS. 4 and 5, the disk driving means E moves to a position where the lowest stage of disk D in the disk package P can be selected. The lever 25 is further movable slightly in X2 direction from its position shown up to the position BB indicated with a chain line in FIG. 4. During this movement between the positions AA and BB, the disk driving means E remains stopped at the position permitting the selection of the lowest-stage disk.

The lever 25, which extends below the bottom plate B1 is integrally formed with an unlocking portion 25a extending in Y1 direction. The unlocking portion 25a is opposed to the unlocking projection 11f. On the Y2 side of the lock member 11 is provided such a stopper driving portion 25b as shown in FIGS. 6A and 6B.

Figure 6A:
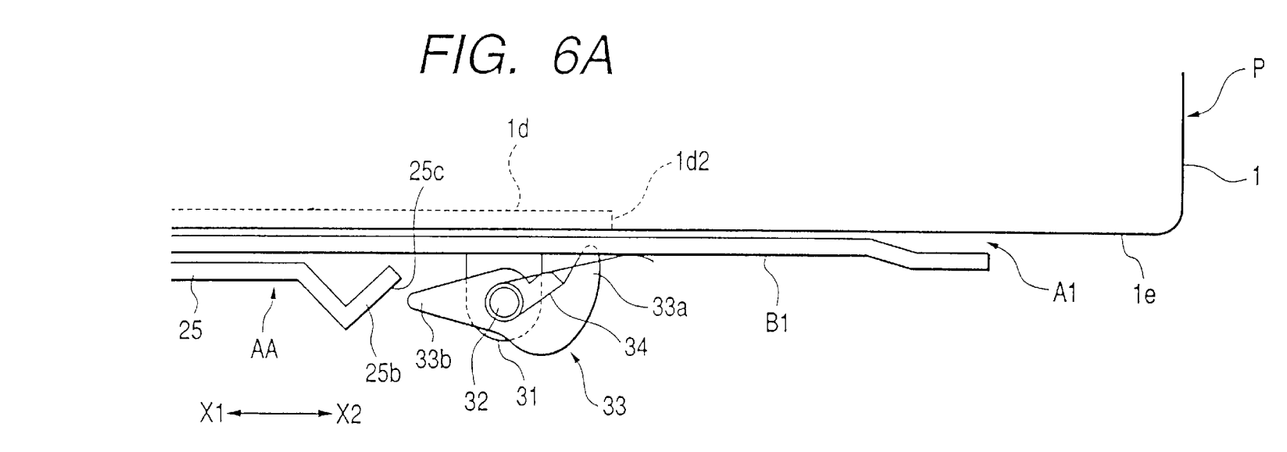
FIGS. 6A and 6B are enlarged side views as seen in the direction of arrow VI in FIGS. 4 and 5, respectively.
Figure 6B:
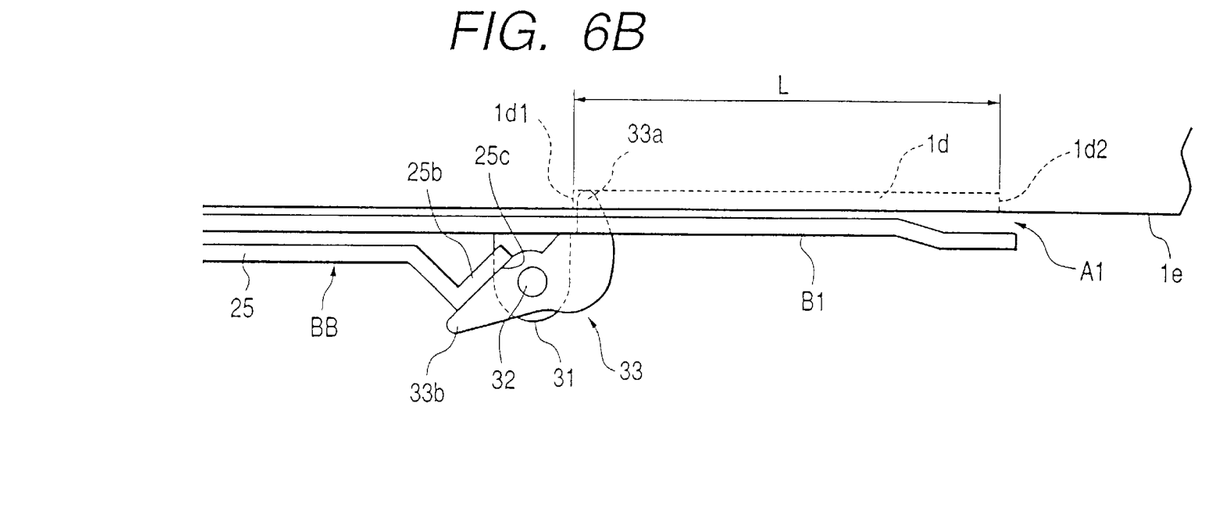

FIG. 6 is a side view as seen in the direction of arrow V1 in FIGS. 4 and 5.

As shown in FIGS. 6A and 6B, a support piece 31 extending in the bottom direction is formed by bending from the bottom plate B1, and a stopper arm 33 is rotatably supported on a shaft 32 fixed to the support piece 31. A torsion spring 34 is mounted on the shaft 32 to urge the stopper arm 33 clockwise in FIG. 6. FIG. 6A shows a state in which the stopper arm 33 has turned most clockwise. The stopper arm 33 is restricted so as not to further turn in the clockwise direction from its position shown in FIG. 6A. A detailed structure for this restriction is here omitted.

At one end portion of the stopper arm 33 is integrally formed a stopper projection 33a, while at the opposite end portion thereof is formed a to-be-pressed portion 33b. The front end of the stopper driving portion 25b of the lever 25 is bent to provide a slant surface 25c. The to-be-pressed portion 33b of the stopper arm 33 is pressed by the slant surface 25c. Moreover, as shown in FIG. 3, in a bottom 1e of the case 1 of the disk package P is formed a stopper groove 1d extending in X direction and parallel with one guide groove 4. As shown in FIG. 6, the stopper projection 33a can get into the stopper groove 1d.

The following description is now provided about the operation of the disk unit constructed as above.

With the disk package P not inserted or being inserted, the lever 25 is in its position AA, as shown in FIG. 4. At this time, the unlocking portion 25a of the lever 25 is spaced apart from the unlocking projection 11f.

Moreover, as shown in FIG. 6A, the stopper driving portion 25b of the lever 25 is spaced away from the to-be-pressed portion 33b of the stopper arm 33. Consequently, the stopper arm 33 is pivotally moved clockwise with the biasing force of the torsion spring 34 and the stopper projection 33a moves down to the position of the bottom plate B1 without striking against the bottom 1e of the case 1 of the disk package P, thus being no obstacle to the insertion of the disk package.

The eject plate 14 moves in X2 direction with the urging force of the urging member S2 and assumes the position (a) shown in FIG. 4. Consequently, the pin 21b of the restriction link 18 is pushed in X2 direction by the restrictive pressing portion 14e of the eject plate 14 and pivotally moves counterclockwise. The Y2-side pin 21a of the restriction link 18 is in abutment with the abutting portion 11e of the lock member 11, whereby the lock member 11 is restricted to a turned state in α2 direction. As a result, the lock projection 11d integral with the lock member 11 and the plural guide lugs 3 are aligned with each other in X direction.

When the disk package P is inserted into the insertion port A1, the guide lugs 3 and the lock projection 11d positioned on a single straight line get into one guide groove 4 formed in the bottom 1e of the package case 1. While the disk package P is inserted in X1 direction, the lock projection 11d functions as a guide member together with the guide lugs 3 without exerting any pressure on the side walls of the guide groove 4, thus imposing no load on the disk package P during insertion of the package. Since the guide projection 11d stands still at its position shown in FIG. 4 and per se functions as a guide member, it is possible to use the guide projection as a guide member and hence possible to reduce the number of the guide lugs 3 or omit the guide lugs.

When the disk package P has entered the package loading area B, an edge portion 1g of the case 1 comes into abutment with the receptacle portion 14b of the eject plate 14. Further, upon insertion of the disk package P, the edge portion 1g pushes the receptacle portion 14b toward the inner part of the package loading area B, so that the eject plate 14 moves in X1 direction in the figure against the urging force of the urging member S2. When the disk package P has been inserted completely into the package loading area B, the eject plate 14 moves to the position (b), as shown in FIG. 5. At this time, the pin 21b of the restriction link 18 is pushed in X1 direction by the releasing pressing portion 14f of the eject plate 14 and moves in the clockwise direction. Consequently, the pin 21a located on the right-hand side of the restriction link 18 is disengaged from the abutting portion 11e to unlock the lock member 11, so that the lock member 11 pivotally moves in α1 direction with the urging force of the urging member S1. Then, the lock projection 11d of the lock member 11 is fitted in the lock groove 4b formed on X2 side of the guide groove 4 of the disk package P, whereby the disk package is locked in its loaded state in the package loading area B.

Description is now directed to the timing at which the restriction link 18 turns clockwise to unlock the lock member 11 and the timing at which the lock projection 11d gets in the lock groove 4b of the disk package P. After insertion of the disk package P in X1 direction and just before complete loading thereof in the package loading area B, the restriction link 18 is turned clockwise by the releasing pressing portion 14f to unlock the lock member 11, then the urging force of the urging member S1 in α1 direction acts on the lock member 11, so that the lock projection 11d is pressed elastically against the side walls of the guide groove 4 in the case 1. Just thereafter, upon complete loading of the disk package P, the lock projection 11d gets in the lock groove 4b by virtue of the urging member S1 to complete locking.

By setting the timings as above, when the disk package P is pushed in X1 direction by hand, the lock projection 11d surely gets into the lock groove 4b at the final stage of the pushing motion.

Alternatively, a modification may be made so that when the disk package P has been inserted completely into the package loading area B, the restriction link 18 is turned clockwise by the releasing pressing portion 14f to unlock the lock member 11 and at this time the lock projection 11d directly gets into the lock groove 4b.

Simultaneously with this locking motion, a push-button of the detection switch SW is pushed by the switch pushing portion 11c of the lock member 11, whereby an electric contact of the detection switch SW is turned ON. An ON signal is provided from the detection switch SW and it is thereby confirmed in an electric circuit mounted in the device body that the disk package P has been surely loaded and locked.

From the time when the disk package P is inserted from the insertion port A1 until when locking is completed as shown in FIG. 5, the lever 25 assumes the position AA (or may be positioned on X1 side with respect to the position AA). Therefore, the stopper arm 33 mounted on the bottom plate B1 remains turned clockwise as in FIG. 6A and the stopper projection 33a is spaced apart from the bottom 1e of the package case 1. However, with the disk package P locked as in FIG. 5, an X2-side end portion 1d2 of the stopper groove 1d is positioned somewhat on X2 side rather than the position just above the stopper projection 33a, thus permitting the stopper projection 33a to get into the stopper groove 1d any time.

Now, a description will be given below of the operation for taking out the disk package P.

Taking out of the disk package P is started by operating an eject button mounted on an operation panel of the disk unit or on a remote controller or the like. Once the eject button is pushed, the lever 25 further moves in X2 direction from its position AA with the power of a motor and reaches the position BB, as shown in FIGS. 4 and 6B. Then, the unlocking projection 11f of the lock member 11 is pushed by the unlocking portion 25a of the lever 25, and the lock member 11 pivotally moves in α2 direction from its locked state shown in FIG. 5. Consequently, the lock projection 11d of the lock member 11 becomes disengaged from the lock groove 4b of the case 1 of the package P and the disk package P is unlocked and becomes free At this time, the edge portion 1g of the package case 1 is pushed in X2 direction by the receptacle portion 14b of the eject plate 14 which is trying to move in X2 direction under the action of the urging member S2, whereby the disk package P is ejected in X2 direction.

Simultaneously with the movement of the lever 25 to the position BB and consequent unlocking of the lock member 11, the stopper driving portion 25b of the lever 25 pushes the to-be-pressed portion 33b of the stopper arm 33, as shown in FIG. 6B, so that the stopper arm 33 turns in the counterclockwise direction and the stopper projection 33a gets into the stopper groove 1d formed in the bottom 1e of the package case 1. Therefore, in the disk package P which is ejected in X2 direction by the eject plate 14, as shown in FIG. 6B, an X1-side end portion 1d1 of the stopper groove 1d strikes against the stopper projection 33a and does not project any further in X2 direction. As shown in FIG. 6B, when the end portion 1d1 of the stopper groove 1d strikes against the stopper projection 33a, the eject plate 14 arrives at the position (a) shown in FIG. 4 and the guide groove 15 and the receptacle portion 14b strike against each other, or the guide groove 14d and the T-shaped projection 17 come into abutment with each other, so that the eject plate 14 stops. At this time, the urging force in X2 direction of the urging member S2 does not act on the eject plate 14.

Therefore, as shown in FIG. 6B, when the end portion 1d1 of the stopper groove 1d strikes against the stopper projection 33a, the ejection urging force in X2 direction of the urging member S2 does not operate on the disk package P. Since the end portion 1d1 of the stopper groove 1d does not push the stopper projection 33a impulsively in X2 direction, there is no fear of the stopper arm 33 being deformed or damaged with the ejection force of the disk package P even if the stopper arm is formed in a very small size by molding a resin for example.

When the eject plate 14 moves in X2 direction and arrives at the position (a) shown in FIG. 4, the releasing pressing portion 14f of the eject plate 14 moves away from the pin 21b, and the restriction link 18 returns counterclockwise to its original position with the biasing force of the urging member S3. Further, the pin 21b is pushed in X2 direction by the restrictive pressing portion 14e of the eject plate 14, so that the restriction link 18 is turned forcibly in the counterclockwise direction. Consequently, the pin 21a of the restriction link 18 comes into abutment with the abutting portion 11e of the lock member 11, the lock member 11 is turned in α2 direction, and the lock projection 11d stops at the position where it is aligned with the guide lugs 3.

Just after completion of the ejecting motion, the disk package P stops while projecting a predetermined distance from the insertion port A1 of the housing A. In this state it is impossible to draw out the disk package P because the stopper projection 33a is within the stopper groove 1d, as shown in FIG. 6B. Therefore, just after projection of the disk package P into its state shown in FIGS. 4 and 6B, the lever 25 is moved in X1 direction with the power of a motor and returns to the position AA, while the stopper driving portion 25b leaves the stopper arm 33. With the biasing force of the torsion spring 34, the stopper arm 33 then turns clockwise as in FIG. 6A and the stopper projection 33a is disengaged from the stopper groove 1d, thus making it possible to draw out the disk package P in X2 direction.

The timing for moving the lever 25 in X1 direction from its state shown in FIG. 6B is taken as follows. For example, it is detected with a switch that the disk package P has projected up to its position shown in FIG. 4, and when this detected output signal is obtained, the motor is started to move the lever 25 in X1 direction. Alternatively, the lever 25 is moved from the position AA to the position BB to let the lock member 11 operate, then after unlocking the disk package P, a predetermined time is set with a timer, and after the lapse of the predetermined time, the lever 25 is returned in X1 direction.

As shown in FIG. 6A, while the disk package P is loaded into the disk unit, the end portion 1d2 of the stopper groove 1d is positioned on X2 side rather than the position just above the stopper projection 33a so that the stopper projection can get into the stopper groove 1d immediately after unlocking. It is necessary that when the disk package P is ejected by the eject plate 14 and stops at the position (a), the end portion 1d1 of the stopper groove 1d be in abutment with or in close proximity to the stopper projection 33a. Therefore, it is necessary that the length L of the stopper groove 1d be almost equal to or larger than the moving distance of the eject plate 14, i.e., the moving distance at which the disk package P is pushed out by the eject plate 14 from its locked state.

According to this embodiment, as shown in FIG. 5, only when the disk package P is locked in the package loading area B, the lock member 11 turns in α1 direction and the detection switch SW turns ON. But in other cases, that is, when the disk package P is not inserted or while it is being inserted, the lock member 11 is restricted by the restriction link 18 and turns in α2 direction, with the detection switch SW remaining OFF.

Thus, the detection switch SW turns ON only when the disk package P has been loaded and hence with a single detection switch SW it is possible to surely detect whether the disk package P has been loaded or not. For example, by monitoring the state of the detection switch SW when the power is turned ON, it is possible to surely detect whether the disk package is in its loaded state or not. Further, the detection switch SW does not turn ON unless the disk package P is locked firmly, so there is no fear of misjudgment that the disk package has been loaded despite the package being in an incompletely inserted state.

According to the recording medium loading device of the present invention, as set forth above, the lock member does not act as an insertion load when the package is loaded. Besides, when the package has been loaded, the lock projection is sure to be fitted in the lock groove, whereby the package can be locked firmly.

Further, since the detection switch operates only when the package has been loaded, the detection of the package loading can be done accurately.

What is claimed is:

1. A recording medium loading device which permits a package containing a recording medium to be loaded removably into the body of the device, the package having a guide groove extending in a direction of insertion into the device body and a lock groove contiguous to said guide groove and formed in a concave shape in a direction intersecting said direction of insertion, and wherein the device body is provided with a lock projection adapted to be fitted in said guide groove to guide the package to a loaded position and to engage said lock groove to lock the package at a loaded position, an urging member for urging said lock projection in a direction of engagement with said lock groove, a restriction member which, when the package is inserted into the device body, restricts said lock projection positioned in said guide groove at a position such as not to elastically press a side wall of said guide groove against an urging force of said urging member, and a release member which releases, in interlock with the insertion of the package, the restriction imposed on said lock projection by said restriction member, the package being inserted and guided to a package loading area while said lock projection is restricted by said restriction member at the position such as not to elastically press said side wall of said guide groove, and said restriction member being operated by said release member upon or just before complete loading of the package into said package loading area to release the restriction imposed on said lock projection by said restriction member, and allowing said lock projection to become engageable in said lock groove with the urging force of said urging member.

2. A recording medium loading device according to claim 1, wherein said device body is provided with a detection switch whose detection output, when said restriction member operates in a direction to release the restriction of said lock projection, is changed over in interlock with said operation of the restriction member, and only when the package has been loaded into said package loading area, said restriction member operates to release the restriction of said lock projection and change over said detection switch.

3. A recording medium loading device according to claim 1, wherein said release member is integral with an eject member which moves together with the package when the package is loaded and which imparts an ejecting force to the package.

4. A recording medium loading device according to claim 3, wherein said eject member is provided with a restrictive pressing portion which moves said restriction member forcibly in a direction to restrict said lock projection when the eject member moves to the package ejecting direction.

5. A recording medium loading device according to claim 2, wherein said release member is integral with an eject member which moves together with the package when the package is loaded and which imparts an ejecting force to the package.

6. A recording medium loading device according to claim 5 wherein said eject member is provided with a restrictive pressing portion which moves said restriction member forcibly in a direction to restrict said lock projection when the eject member moves to the package ejecting direction.

7. A recording medium loading device according to claim 1, wherein said lock projection is moved against the urging force of said urging member by the power of a motor in a direction such as to disengage from said lock groove when the package is taken out of the loaded position.

8. A recording medium loading device according to claim 7, wherein a lock member having said lock projection is pivotally provided in the device body and a lever drivingly connected to said motor is provided in said device body, and wherein, when the package is taken out of the loaded position, said lever is contacted with said lock member by the power of said motor so as to pivot said lock member against the urging force of said urging member and to move said lock projection in a direction such as to disengage from said lock groove.

* * * * *